United States Patent
Mori et al.

[19]

[11] Patent Number: 6,163,327
[45] Date of Patent: Dec. 19, 2000

[54] IMAGE FORMING APPARATUS FOR CONTROLLING THE PERIOD OF ROTATIONAL DRIVING OF EACH TONER IMAGE CARRIER

[75] Inventors: Hirotaka Mori; Ryo Ando, both of Ebina, Japan

[73] Assignee: Fuji Xerox Co., Ltd., Tokyo, Japan

[21] Appl. No.: 08/886,043

[22] Filed: Jun. 30, 1997

[30] Foreign Application Priority Data

Jul. 4, 1996 [JP] Japan .................................. 8-175172

[51] Int. Cl.⁷ .............................. B41J 2/385; G03G 15/01
[52] U.S. Cl. ........................................... 347/115; 399/179
[58] Field of Search .................... 399/177, 179; 347/115, 116

[56] References Cited

U.S. PATENT DOCUMENTS

| | | | |
|---|---|---|---|
| 5,014,094 | 5/1991 | Amitani et al. | 399/179 X |
| 5,331,341 | 7/1994 | Egawa et al. | 347/115 X |
| 5,452,073 | 9/1995 | Kataoka | 347/116 X |
| 5,541,637 | 7/1996 | Ohashi et al. | 347/248 |
| 5,634,171 | 5/1997 | Muto | 399/51 X |
| 5,854,958 | 12/1998 | Tanimoto et al. | 347/116 X |

FOREIGN PATENT DOCUMENTS

| | | |
|---|---|---|
| 1-0 291 738 | 11/1988 | European Pat. Off. . |
| 2-0 552 007 | 7/1993 | European Pat. Off. . |
| 2-0 774 859 | 5/1997 | European Pat. Off. . |
| 63-6577 | 1/1988 | Japan . |
| 6-246975 | 9/1994 | Japan . |
| 7-160084 | 6/1995 | Japan . |

*Primary Examiner*—Fred L. Braun
*Attorney, Agent, or Firm*—Oliff & Berridge, PLC

[57] ABSTRACT

An image forming apparatus forms a multicolor toner image by superposing a plurality of monochromatic toner images on a transfer material. The apparatus has: a plurality of toner image carriers on which monochromatic toner images of different colors are respectively formed; toner-image-carrier driver for driving all the toner carriers to rotate in a predetermined period; and a position-shift correction quantity detector for determining the position shift quantity of each monochromatic toner image in the multicolor toner image and outputting a position-shift correction quantity corresponding to the detected result. The toner-image-carrier driver controls the period of rotational driving of each toner image carrier in conformity with the position-shift correction quantity.

8 Claims, 18 Drawing Sheets

IMAGE INFORMATION

IMAGE-WRITING START SIGNAL

FIG. 8A
 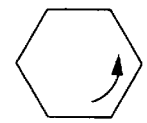
FIG. 8B
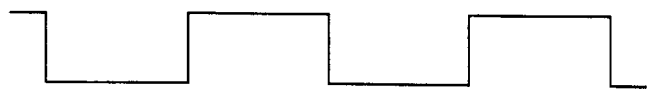 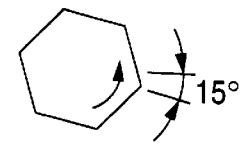
FIG. 8C
 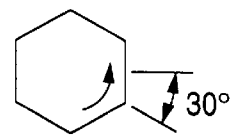
FIG. 8D
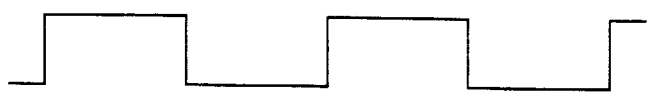 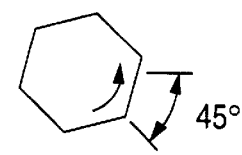
IN CASE OF A HEXAGONAL FOUR DIVISION

IMAGE FORMING APPARATUS FOR CONTROLLING THE PERIOD OF ROTATIONAL DRIVING OF EACH TONER IMAGE CARRIER

BACKGROUND OF THE INVENTION

The present invention relates to an image forming apparatus for use as a color copying machine, a color printer and so forth and more particularly to an image forming apparatus for forming a plurality of monochromatic toner images and superimposing the plurality of monochromatic toner images on a transfer material in order to form a multicolor toner image.

Heretofore, an image forming apparatus of the sort mentioned above has, for example, four monochromatic toner image forming units for respectively forming a black, a yellow, a magenta and a cyan image, and a transfer material conveyer unit for conveying a transfer material such as printing paper. The four monochromatic toner image forming units are arranged in a line and the transfer material conveyer unit is adapted for conveying the transfer material along the arrangement of the monochromatic toner image forming units, so that the monochromatic toner image formed in each monochromatic toner image forming unit is successively transferred onto the transfer material.

Each of the monochromatic toner image forming units has, for example, a photoconductive drum which is rotatably installed, a uniform charger corotron for charging the photoconductive drum with a predetermined potential, a laser exposure unit for exposing to light the photoconductive drum according to image information, a developing device for developing a latent image with predetermined color toner, and a transfer corotron for transferring the toner image onto the transfer material. The monochromatic toner image forming unit concerned is used for forming the monochromatic toner image on the photoconductive drum by operating the uniform charger corotron, the laser exposure unit and the developing device while the photoconductive drum is being rotated. Further, the laser exposure unit has, for example, a rotatable polygon mirror and a light emitting element for irradiating the polygon mirror with exposure light from a predetermined direction. The light emitting element is caused to emit light according to the image information at timing at which the exposure light reflected from the polygon mirror is emitted onto the photoconductive drum, so that the latent image is formed on the photoconductive drum. The position between the photoconductive drum and the transfer corotron is hereinafter called a transfer position.

The transfer material conveyer unit has, for example, a transfer belt rotatably installed so as to pass the transfer position of each monochromatic toner image forming unit, a paper tray capable of accommodating a number of printing papers, a paper supply member for conveying printing paper from the paper tray to the transfer belt, a transfer-material drawing charger for electrostatically drawing the printing paper to the transfer belt, and a fixing device for fixing the transfer material peeled off the transfer belt.

In the image forming apparatus described above, the predetermined monochromatic toner image is formed in each monochromatic toner image forming unit and after the transfer material has been drawn to the transfer belt, the monochromatic toner image formed in each monochromatic toner image forming unit is successively transferred onto the transfer material in order to form a multicolor toner image.

In the case of such a conventional image forming apparatus, a monochromatic toner image of each color is formed in the corresponding monochromatic toner image forming unit and a multicolor toner image is formed by transferring the monochromatic toner image to the corresponding transfer position and superimposing the monochromatic toner images on the transfer material (transfer belt).

Consequently, in the image forming apparatus above, a color shift is caused between the monochromatic toner images of the multicolor toner image formed on the transfer material due to the shifting of the position where the toner image is exposed to light by the laser exposure unit on the photoconductive drum of each toner image forming unit and the shifting of the position where the toner image is placed with respect to the transfer position of each photoconductive drum. Thus, a change in hue, a color shift and the like are produced in the color image involved.

In the image forming apparatus above, moreover, not only the transfer position of the each photoconductive drum but also the exposure position in each toner image forming unit varies as the environmental conditions such as temperature and moisture change; the problem in this case is that the way the color shift occurs becomes unsettled.

In order to correct the color shift, it is considered to adjust the position where the monochromatic toner image is formed on the transfer material by controlling the timing, on a laser exposure unit basis, at which the image information is superposed on the exposure light so as to vary the position where the latent image is written to the photoconductive drum, that is, the timing at which the monochromatic toner image corresponding to the latent image reaches the transfer position.

However, it is still not possible to correct the position shift quantity of one exposure width or less, though it is possible to correct the color shift at each timing at which the reflective surface of each polygon mirror is rotated to a predetermined position, that is, to correct the color shift on a one exposure width basis through the technique mentioned above.

As disclosed in the Unexamined Japanese Patent Application Publication No. Hei 7-160084, further, the rotational phase of the polygon mirror used for the laser exposure unit of each monochromatic toner image forming unit is controlled, that is, the timing at which the reflective surface of the polygon mirror is rotated to a predetermined exposable-to-light position is controlled on a polygon mirror basis, in other words, the exposure timing is controlled on a polygon mirror basis so as to vary the timing at which the monochromatic toner image corresponding the exposure reaches each transfer position, whereby the position where the monochromatic toner image is formed on the transfer material is made adjustable. This technique is usable for correcting a color shift of one exposure width or less. On the other hand, the control of the rotational phase of the polygon mirror alone is disadvantageous for correcting the one exposure width or greater, so that this technique has to be used in combination of what has been mentioned previously.

In order to the control the rotational phase of the polygon mirror, however, a driving signal corresponding to each rotational phase needs preparing and besides a signal required to be synchronized with the rotation of the polygon mirror, for example, a timing signal (a so-called line sink signal) for superposing the image information on the light emitting element and the like has to be made to correspond to the rotational phase.

With the above-described control of the rotational phase of the polygon mirror, the greater the number of phase steps that can be set is made, the greater the number of various signal lines becomes, which makes it far delicate and difficult to design signal-line to signal-line synchronization and the adjustment thereof; 4 steps and even maximum 8 steps at the most.

Consequently, the rotational phase of the polygon mirror is controlled by dividing the one exposure width into 4 steps and even maximum 8 steps, with which the color shift is barely corrected within the resolution range, and a color shift of width less than that remains unadjustable and this has imposed limitation on the pursuit of a high-quality image.

Moreover, the control of the rotational phase of the polygon mirror makes it a premise to follow the technique of installing a polygon mirror in each monochromatic toner image forming unit and when each laser exposure unit emits exposure light to one polygon mirror, that is, when an image forming apparatus has only one polygon mirror to be commonly used for a plurality of monochromatic toner image forming units, the polygon mirror is unutilizable.

With the control of the rotational phase of the polygon mirror, further, when each laser exposure unit is designed to emit simultaneously more than one beam, for example, in the case of a so-called dural beam type laser exposure unit, a triple beam type laser exposure unit or a quad beam type laser exposure unit, the greater the number of simultaneous emission beams becomes, the greater the number of steps is required to be set, whereupon the aforementioned control is practically unable to be utilized.

SUMMARY OF THE INVENTION

It is therefore an object of the present invention to provide an image forming apparatus capable of adjusting even a color shift of one exposure width or less with high resolution and consequently seeking high image quality.

According to the present invention, an image forming apparatus for forming a multicolor toner image by superposing a plurality of monochromatic toner images of different colors on a transfer material, comprises a plurality of toner image carriers on which monochromatic toner images of different colors are respectively formed, toner-image-carrier driving means for driving all the toner carriers to rotate in a predetermined period, and position-shift correction quantity detecting means for detecting the position-shift correction quantity of each monochromatic toner image in the multicolor toner image or a value correlated thereto and outputting position-shift correction quantity corresponding to the detected result, wherein the toner-image-carrier driving means controls the period of rotational driving of each toner image carrier in conformity with the position-shift correction quantity.

According to the present invention, the toner image carrier may be any one of such a type that a monochromatic toner image of each color is formable thereon: for example, a latent image carrier such as a photoconductive drum or an intermediate transfer material such as an intermediate transfer belt.

An image forming apparatus using the intermediate transfer belt is such that, as shown in FIG. 19, a plurality of photoconductive drums 1 are arranged in a line and an intermediate transfer belt 22 is installed along the photoconductive drums 1 so that it is brought into contact with all of the photoconductive drums 1 and further a conveyer channel of copying paper P is kept in contact with the intermediate transfer belt 22; or otherwise a plurality of photoconductive drums 1 are arranged in a line and a transfer belt 6 is so installed along the photoconductive drums 1 that it is separated from the photoconductive drums 1 and further an intermediate transfer belt 22 is disposed between each photoconductive drum 1 and the transfer belt 6 as shown in FIG. 20.

The toner-image-carrier driving means may be what is capable of driving all the toner image carriers to rotate in a predetermined period and besides controlling the rotational period of each toner image carrier; for example, it is one-to-one connected each toner image carrier, has a plurality of stepping motors for rotating in conformity with the period of an input signal and a plurality of voltage control type oscillating circuits for supplying a signal of a predetermined period to each stepping motor; or otherwise it is one-to-one connected each toner image carrier, has a plurality of stepping motors for rotating in conformity with the period of an input signal, an oscillating circuit for oscillating a signal of a predetermined frequency and a frequency divider circuit for dividing the frequency of the signal according to the set-up condition. In the case of the former, the rotational speed of each stepping motor is made adjustable by controlling the control voltage supplied to the each voltage control type oscillating circuit in conformity with the position-shift correction quantity, whereas in the case of the latter, the rotational speed of each stepping motor is made adjustable by varying the dividing ratio of the frequency divider circuit in conformity with the position-shift correction quantity, whereby the rotational period of the toner image carrier can be adjusted.

An ideal rotational period of the toner image carrier determined at the time it is designed such as a reference rotational period may be set in the substantially middle of a period regulating range by means of the toner-image-carrier driving means. Thus, the rotational period of each toner image carrier is allowed to have a necessary period difference while variation in the rotational period of each toner image carrier is suppressed. Particularly when the reference rotational period is set at the middle value in the period adjustment range, the variation in the rotational period under control according to the present invention can be halved in comparison with a case where the period adjustment range is set from one direction of the reference rotational period. Thus, the actual slip quantity of the toner image carrier can be suppressed as close to a target slip quantity as possible (see FIG. 21).

In this case, the control by the toner-image-carrier driving means may be exerted at the time no image is formed since it is feared that because of a transient phenomenon due to the control thus exerted thereby, lack of uniformity is possible in the rotational speed of the toner image carrier. Particularly when the voltage control type oscillating circuit is used for the toner-image-carrier driving means, such control may be exerted at the time no image is formed because ringing as the transient phenomenon produced in the control voltage may appear as the distortion of the image.

The position-shift correction quantity detecting means may be any one of which is capable of detecting the position-shift correction quantity of each monochromatic toner image in the multicolor toner image or the value correlated thereto and outputting the position-shift correction quantity corresponding to the detected result; for example, what is capable of optically reading the multicolor toner image so as to detect the position shift quantity of each monochromatic toner image in the read image and outputting the detected result as the position-shift correction quantity or otherwise optically reading a transfer material with a color-shift detecting pattern formed thereon so as to detect the position shift quantity of each pattern in the read image and outputting the detected result as the position-shift correction quantity. Further, the position-shift correction quantity detecting means may be what is used for detecting actual position shift quantity with respect to a position where the toner image on a monochromatic toner image basis (i.e., detecting absolute position shift quantity) or detecting the mutual position shift quantity of the monochromatic toner images in the multicolor toner image (i.e., detecting relative position shift quantity).

The image forming apparatus according to the present invention may be provided with the position-shift correction quantity detecting means for detecting the position-shift correction quantity of each monochromatic toner image in the multicolor toner image or the value correlated thereto and outputting the position-shift correction quantity corresponding to the detected result, and toner-image-carrier driving means for controlling the period of rotational driving of each toner image carrier in conformity with the position-shift correction quantity; in other words, it is possible to adjust a period extending from the formation of a monochromatic toner image on each toner image carrier up to the formation of each monochromatic toner image on the transfer material, that is, the monochromatic toner images can be superposed on the transfer material without shifting.

In the image forming apparatus above, a color shift can be corrected without adjusting any other control signal and the like since the color shift is corrected by adjusting the rotational period of each toner image carrier.

In the image forming apparatus above, further, the color shift in the multicolor toner image can also be corrected to substantially zero with fine resolution only by adjusting the rotational period of each toner image carrier, whereby the position-shift correction quantity is adjustable through the correction technique according to the present invention even in a case where the position-shift correction quantity is slightly greater than one exposure width.

In the image forming apparatus above, moreover, exposure means for subjecting each latent image carrier to exposure scanning on a one pixel basis and forming a latent image on each latent image carrier on a one pixel width basis by superposing image information on the exposure light when the monochromatic toner image is formed on each latent image carrier may be provided; the exposure means may control timing at which the image information is superposed on the exposure light in conformity with the position-shift correction quantity; and with respect to adjustment of one pixel width or less, toner-image-carrier driving means may control the period of rotational driving of each toner image carrier.

The exposure means may have, for example, a rotatable polygon mirror which is provided one-to-one for the latent image carrier, and a light emitting element capable of emitting light according to image information and provided one-to-one for the latent image carrier, so that the polygon mirror and the light emitting element in pair form a latent image on each latent image carrier or otherwise it may have a rotatable polygon mirror and a light emitting element capable of emitting light according to image information and provided one-to-one for the latent image carrier, so that each light emitting element emits exposure light to the polygon mirror to make the light reflected therefrom form a latent image on each latent image carrier.

Even when position-shift correction of one pixel width or greater, for example, is made in the image forming apparatus according to the present invention, the fluctuating range of the period under the control of rotational driving period of the toner image carrier can be suppressed in a very small fluctuating range corresponding to one pixel width to the utmost. Thus, it is possible to suppress the occurrence of secondary trouble such as an increase in the fluctuation of slip quantity at the transfer position due to the control of the period and an increase in the fluctuation of development efficiency and transfer efficiency due to the control of the period.

In the image forming apparatus above, moreover, exposure means for subjecting each latent image carrier to exposure scanning on the basis of a plurality of pixels and forming a latent image on each latent image carrier on the basis of a plurality of pixel widths by superposing image information on the exposure light when the monochromatic toner image is formed on each latent image carrier may be provided; the exposure means may control timing at which the image information is superposed on the exposure light in conformity with the position-shift correction quantity; and with respect to adjustment of the plurality of pixel widths or less, the toner-image-carrier driving means may control the period of rotational driving of each toner image carrier.

The exposure means may have, for example, a rotatable polygon mirror which is provided one-to-one for the latent image carrier, and a light emitting element capable of emitting light according to image information and provided one-to-plurality for the latent image carrier, so that the polygon mirror and a set of light emitting elements in pair form a latent image on each latent image carrier or otherwise it may have a rotatable polygon mirror and a light emitting element capable of emitting light according to image information and provided one-to-plurality for the latent image carrier, so that each set of light emitting elements emits exposure light to the polygon mirror to make the light reflected therefrom form a latent image on each latent image carrier.

Even when position-shift correction of the plurality of pixel widths or greater, for example, is made in the image forming apparatus according to the present invention, the fluctuating range of the period under the control of rotational driving period of the toner image carrier can be suppressed in a very small fluctuating range corresponding to the plurality of pixel widths to the utmost. Thus, it is possible to suppress the occurrence of secondary trouble such as an increase in the fluctuation of slip quantity at the transfer position due to the control of the period and an increase in the fluctuation of development efficiency and transfer efficiency due to the control of the period.

Since the fluctuating range of the period under the control of the rotational driving period of the toner image carrier is set up to the plurality of pixel widths in the image forming apparatus, moreover, the exposure means needs not switch over the allocation of image information to each light emitting element, that is, the combination of the image information and the light emitting element and makes it possible only to control the timing at which the image information is superposed on the exposure light as in the case of making exposure-scanning on one pixel basis, thus preventing the arrangement from becoming particularly complicated.

The technique of subjecting the latent image carrier to exposure scanning on the basis of the plurality of pixels is generally utilized for the image forming apparatus designed to attain high resolution and even when a dual beam is used for exposure scanning, for example, the one exposure width is not made extremely wider than that in the case of exposure scanning with a single beam and this means the fluctuating range of the period under the control of the rotational driving period of the toner image carrier is kept as small as that with the use of such a single beam.

In an image forming apparatus having a light emitting element provided one-to-one for a latent image carrier and one polygon mirror, a color shift of one exposure width or less, particularly a color shift of one pixel width or less has not been corrected only by a system of operating an exposure device or a system of moving the optical axis of such an exposure device, that is, an expensive system having a complicated mechanism. However, the correcting technique according to the present invention allows a color shift to be corrected simply and less costly.

In the image forming apparatus above, further, the exposure means which has the polygon mirror and the light emitting element and is used for subjecting each latent image carrier to exposure scanning on a one-to-plurality pixel basis and forming a latent image on each latent image carrier on a one exposure width basis by superposing image information on the exposure light when the monochromatic toner image is formed on each latent image carrier may be provided; the exposure means may control timing at which the image information is superposed on the exposure light in conformity with the position-shift correction quantity; and with respect to adjustment of one exposure width or less, the exposure means may control the rotational phase of each polygon mirror, whereas the toner-image-carrier driving means may control the period of rotational driving of each toner image carrier.

Thus, even when position-shift correction of one exposure width or less, for example, is made in the image forming apparatus according to the present invention, the fluctuating range of the period under the control of rotational driving period of the toner image carrier can be suppressed within a width controllable by the rotational phase of the polygon mirror. Thus, it is possible to suppress the occurrence of secondary trouble such as an increase in the fluctuation of slip quantity at the transfer position due to the control of the period and an increase in the fluctuation of development efficiency and transfer efficiency due to the control of the period. Since the fluctuating width of the slip is especially suppressed in the image forming apparatus above, moreover, a so-called hollow character in an image and the like, for example, can simultaneously be prevented by finely setting up slip quantity.

BRIEF DESCRIPTION OF THE DRAWINGS

FIGS. 8A to 8D are diagram explanatory of the relation between a divided signal and a polygon mirror.

DETAILED DESCRIPTION OF THE PREFERRED EMBODIMENTS

A detailed description will subsequently be given of an image forming apparatus embodying the present invention with reference to the accompanying drawings.
(Embodiment 1)

Figure 1:
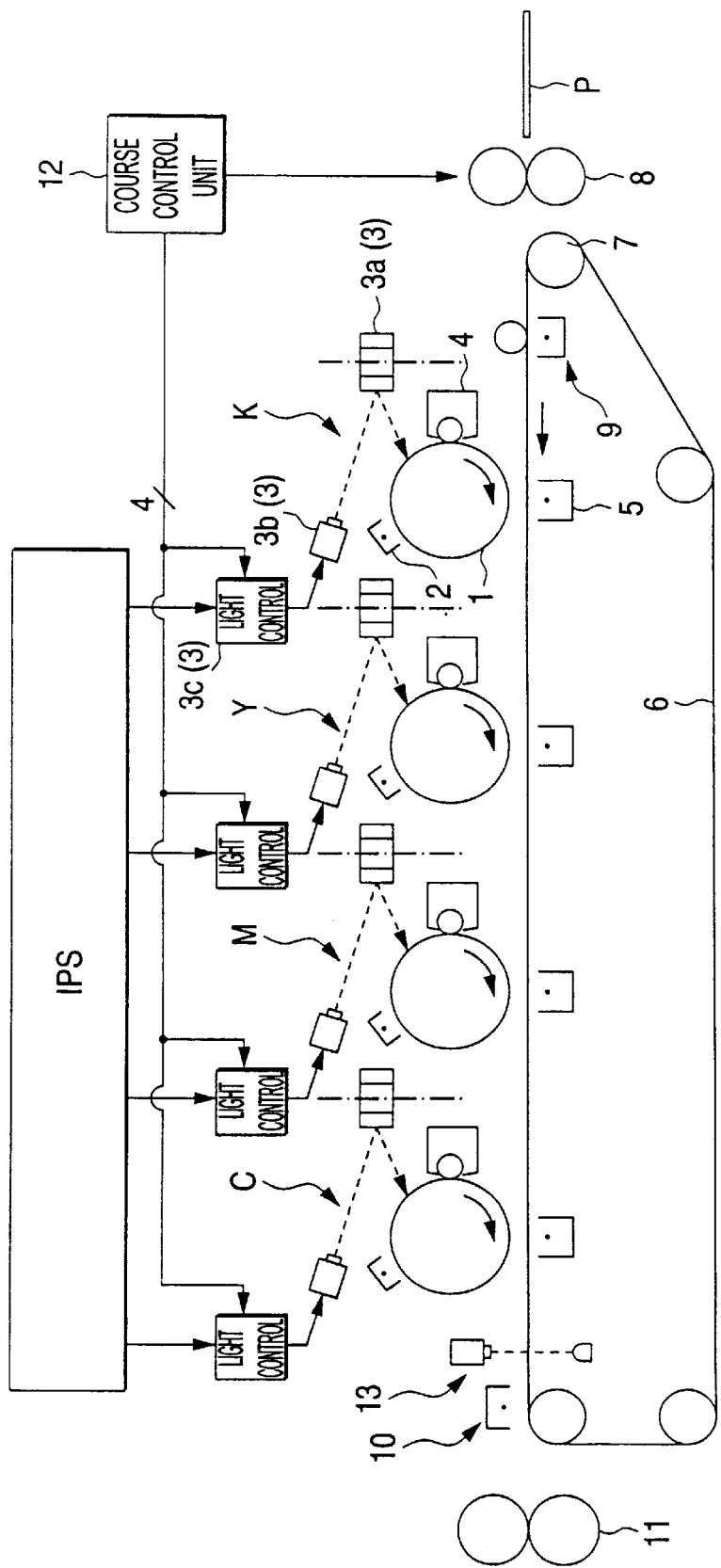
FIG. 1 is a schematic block diagram of an image forming apparatus as Embodiment 1 of the invention.
Figure 2A:
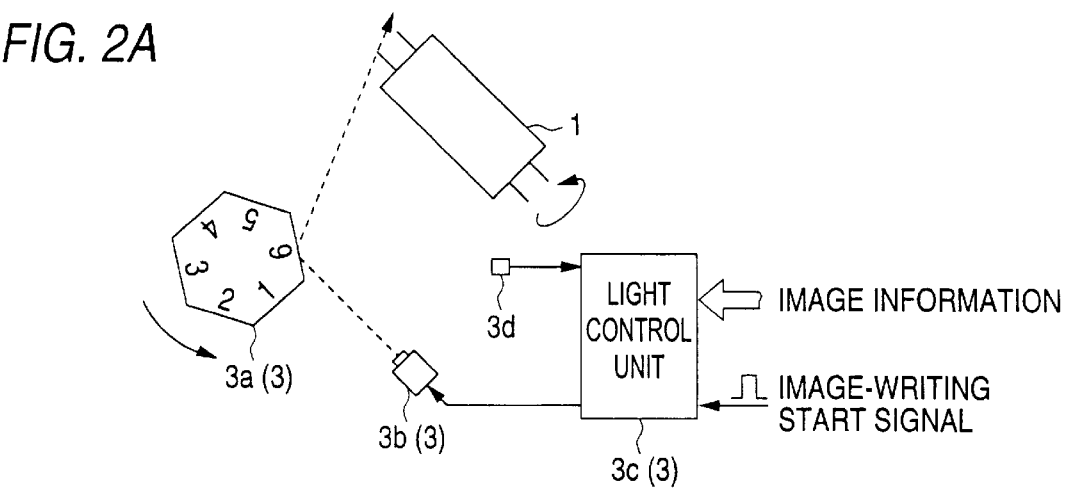
FIGS. 2A to 2C are one diagram explanatory of an image forming operation of each toner image forming unit of the image forming apparatus of FIG. 1.
Figure 2B:
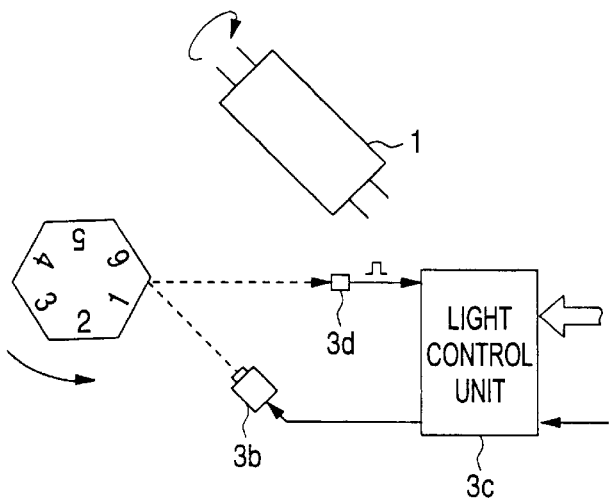
Figure 2C:
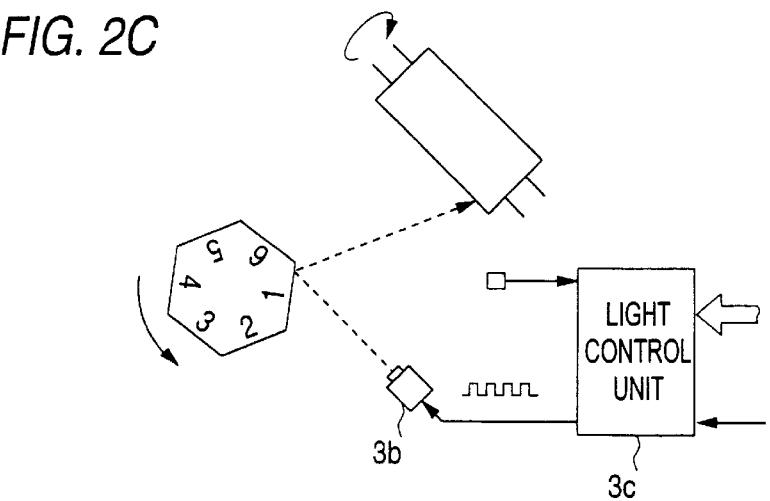
Figure 3A:
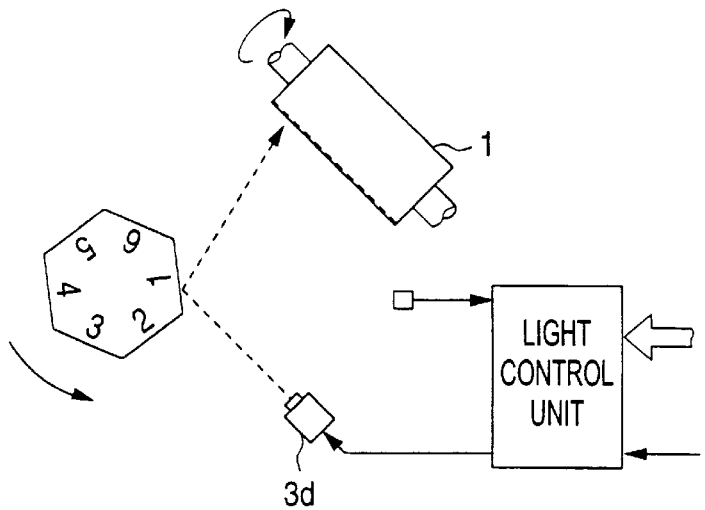
FIGS. 3A to 3C are the other diagram explanatory of an image forming operation of each toner image forming unit of the image forming apparatus of FIG. 1.
Figure 3B:
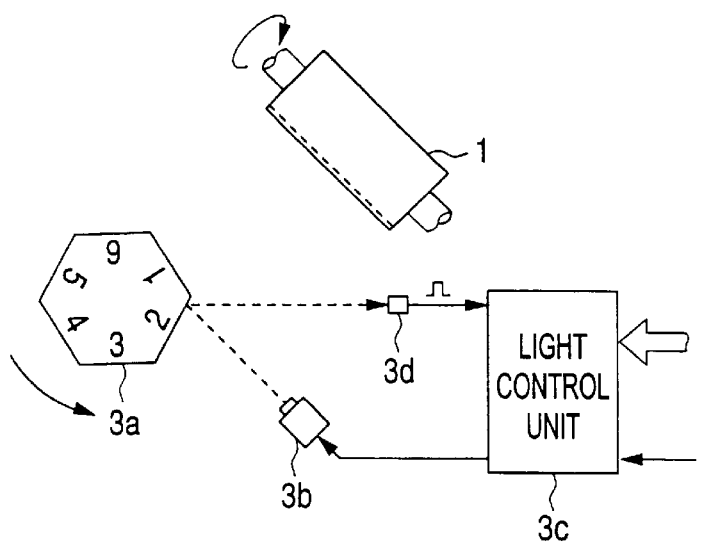
Figure 3C:
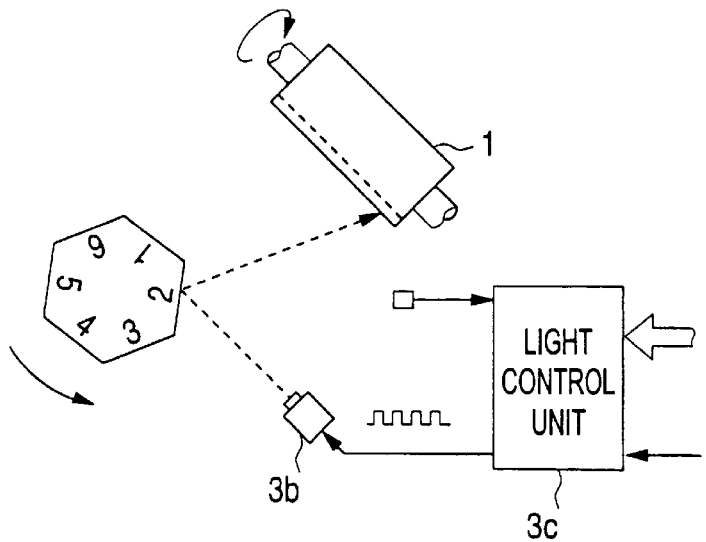

FIG. 1 shows a full-color copying machine embodying the present invention.

The aforementioned image forming apparatus has an image processing system (IPS) for extracting information about images of black, yellow, magenta and cyan colors from predetermined full-color image information, and an image output system for forming a multicolor toner image, namely, a predetermined full-color image by forming monochromatic toner images of respective colors and superposing the plurality of monochromatic toner images on a transfer material.

The image output system has four monochromatic toner image forming units K, Y, M, C for forming monochromatic toner images of predetermined colors, and a transfer material conveyer unit for conveying a transfer material P such as printing paper, OHP sheets and the like. The monochromatic toner image forming units K, Y, M, C are arranged in a line and the transfer material conveyer unit is installed so that the transfer material P can be conveyed along the line.

Each of the monochromatic toner image forming units has a rotatable photoconductive drum 1; a uniform charger corotron 2 for charging the photoconductive drum with a predetermined potential, the uniform charger corotron 2 being installed opposite to the photoconductive drum 1; a laser exposure unit 3 for exposing to light the photoconductive drum 1 according to information about an image of each color so as to form an electrostatic latent image on the photoconductive drum 1; a developing device 4 for storing toner of the same color as the color designated by the image information so as to develop the electrostatic latent image involved with that toner; a transfer corotron 5 for transferring the toner image to the transfer material P; a photoconductive-drum cleaning means (not shown); and a photoconductive-drum driving stepping motor 66 for driving the photoconductive drum 1 to rotate in a predetermined cycle. In this case, a position of the photoconductive drum 1 exposed to light by the laser exposure unit 3 is called an exposure position, and the position between the photoconductive drum 1 and the transfer corotron 5 is hereinafter called a transfer position.

The laser exposure unit 3 has one rotatable polygon mirror 3a, one laser diode 3b for emitting light according to a predetermined light emission control signal, a light emission control unit 3c for outputting a light emission control signal at a predetermined timing on receiving and according to the information about the image of each color, an SOS sensor (scanning start signal) 3d for detecting the rotational phase of the polygon mirror 3a from the light reflected therefrom, and a polygon-mirror driving stepping motor 3e for turning the polygon mirror 3a in the predetermined cycle and phase. The laser exposure unit 3 exposes to light the photoconductive drum 1 by letting the polygon mirror 3a reflect the exposure light of the laser diode 3b.

Although only a black toner image forming unit K is indicated with reference numerals, this is also the same with the other monochromatic toner image forming units.

Each of the monochromatic toner image forming units K, Y, M, C causes the uniform charger corotron 2 to charge the photoconductive drum 1. The laser exposure unit 3 exposes to light the photoconductive drum 1 according to the information about the image of each color and the developing device 4 develops the electrostatic latent image involved, so that a monochromatic toner image of each color is formed on the photoconductive drum 1.

While the photoconductive drum 1 and the polygon mirror 3a in each of the monochromatic toner image forming units K, Y, M, C are being rotated, an image-writing start signal is input to the light emission control unit 3c as shown in FIGS. 2A to 3C and when the detection signal of the SOS sensor 3d is input thereto, the light emission control unit 3c controls the light emission of the laser diode 3b according to the image information. Thus, an electrostatic latent image of one pixel width is formed on the photoconductive drum 1 along its axis of rotation (see FIGS. 2A to 2C and FIG. 3A). Further, the photoconductive drum 1 is turned by one scanning width until the next reflective surface (reflective surface of No. 2) of the polygon mirror 3a is turned to the target position of the laser diode 3b (see FIG. 3B) and the light emission control unit 3c involved controls the light emission of the laser diode 3b according to the image information so as to form the next electrostatic latent image of one pixel width (see FIG. 3C). Then each of the monochromatic toner image forming units K, Y, M, C repeats this process a predetermined number of times, whereby the monochromatic toner image forming unit can form a predetermined electrostatic latent image, that is, a monochromatic toner image on the photoconductive drum 1.

On the other hand, the transfer material conveyer unit has a transfer belt 6 rotatably installed so as to pass the transfer position of each of the monochromatic toner image forming units K, Y, M, C; a transfer-belt driving means 7 for driving the transfer belt 6 to rotate; a pair of registration rolls 8 for supplying a transfer material P to the transfer belt 6 at predetermined timing; a transfer-material drawing device 9 which is disposed opposite to the transfer belt 6 and used for electrostatically drawing the transfer material P to the transfer belt 6; a transfer-material peeling device 10 which is disposed opposite to the transfer belt 6 and used for peeling the transfer material P off the transfer belt 6 by eliminating charge from the transfer material P; and a pair of fixing rolls 11 for heat-pressing the transfer material P.

The registration rolls 8 supply the transfer material P to the transfer belt 6 at the predetermined timing and the transfer belt 6 conveys the printing paper P while drawing it and besides the fixing rolls 11 discharge the printing paper P, thus enabling the transfer material conveyer unit to convey the transfer material P.

In the above image output system, the operations of the four monochromatic toner image forming units K, Y, M, C have to be synchronized with the operation of the transfer material conveyer unit in order to form a desired multicolor toner image on the transfer material P by superposing the monochromatic toner images, namely, to form a predetermined full-color image on the transfer material P.

According to this embodiment of the invention, there are provided a coarse synchronizing control unit 12 for generating the image-writing start signal to each of the monochromatic toner image forming units K, Y, M, C and an operating signal to the registration rolls 8 of the transfer material conveyer unit in predetermined timing relationship, and a fine synchronizing control unit for finely and properly regulating image-writing start timing of each of the monochromatic toner image forming units K, Y, M, C.

Figure 4:
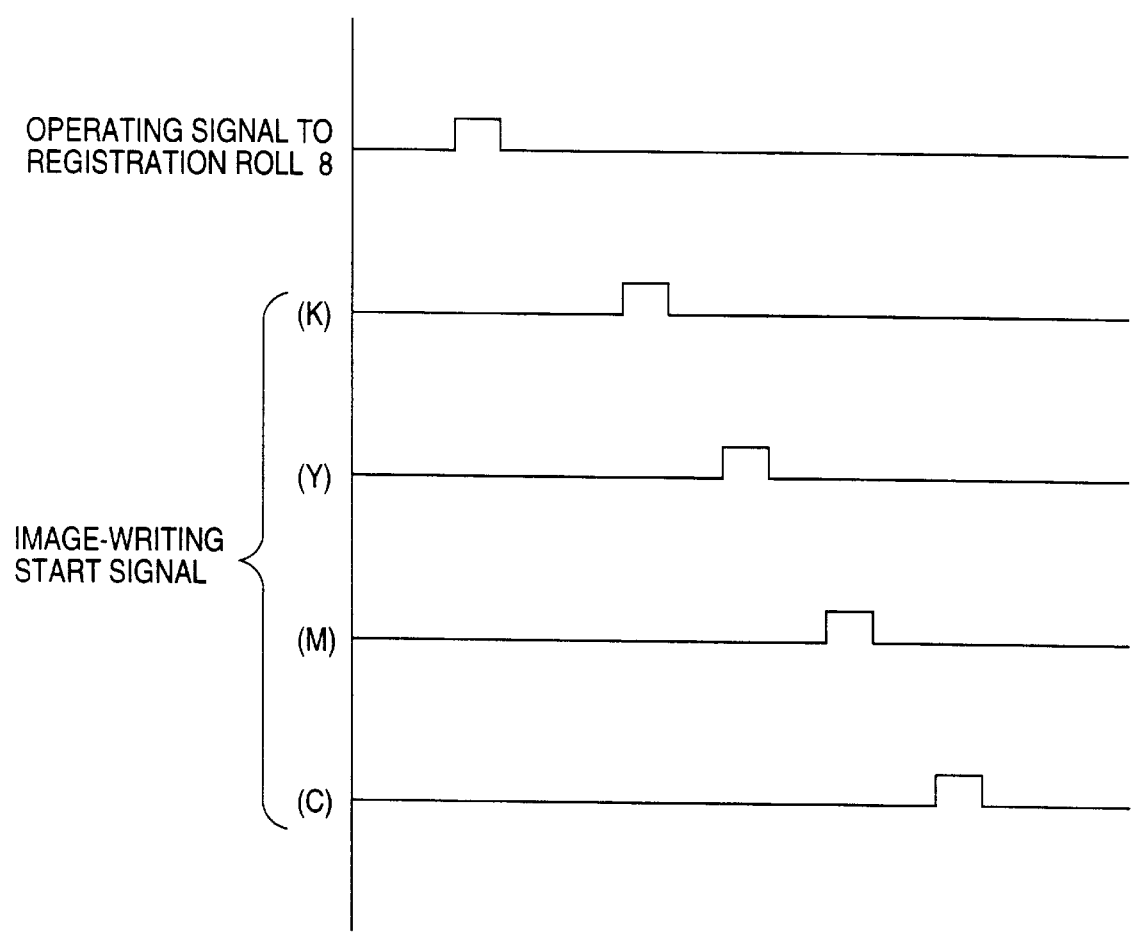
FIG. 4 is a timing chart for explaining the timing relation of an output signal of a coarse synchronizing control unit in the image forming apparatus of FIG. 1.

The coarse synchronizing control unit 12 generates the image-writing start signal and a registration-roll operating signal in a manner that allows synchronization to be attained according to the design specification based on, for example, the surface speed of the photoconductive drum 1, the surface speed of the transfer belt 6, the angle set between the exposure position and the transfer position, the distance between the registration rolls 8 and each transfer position and the like. Incidentally, the timing relation among them is like what is shown in FIG. 4, for example.

The fine synchronizing control unit controls the image-writing start timing, the rotational phase of the polygon mirror and the period of rotation of the photoconductive drum 1 in each of the monochromatic toner image forming unit Y for the yellow toner image, the monochromatic toner image forming unit M for the magenta toner image and the monochromatic toner image forming unit C for the cyan toner image, so that these toner images are superposed on the black toner image at the respective transfer positions. Incidentally, the fine synchronizing control unit may needless to say be adapted for use in controlling the image-writing start timing and the rotational phases of the polygon mirrors, and the period of rotation of the photoconductive drums 1 in all of the monochromatic toner image forming units K, Y, M, C so as to superpose the monochromatic toner images.

Figure 5:
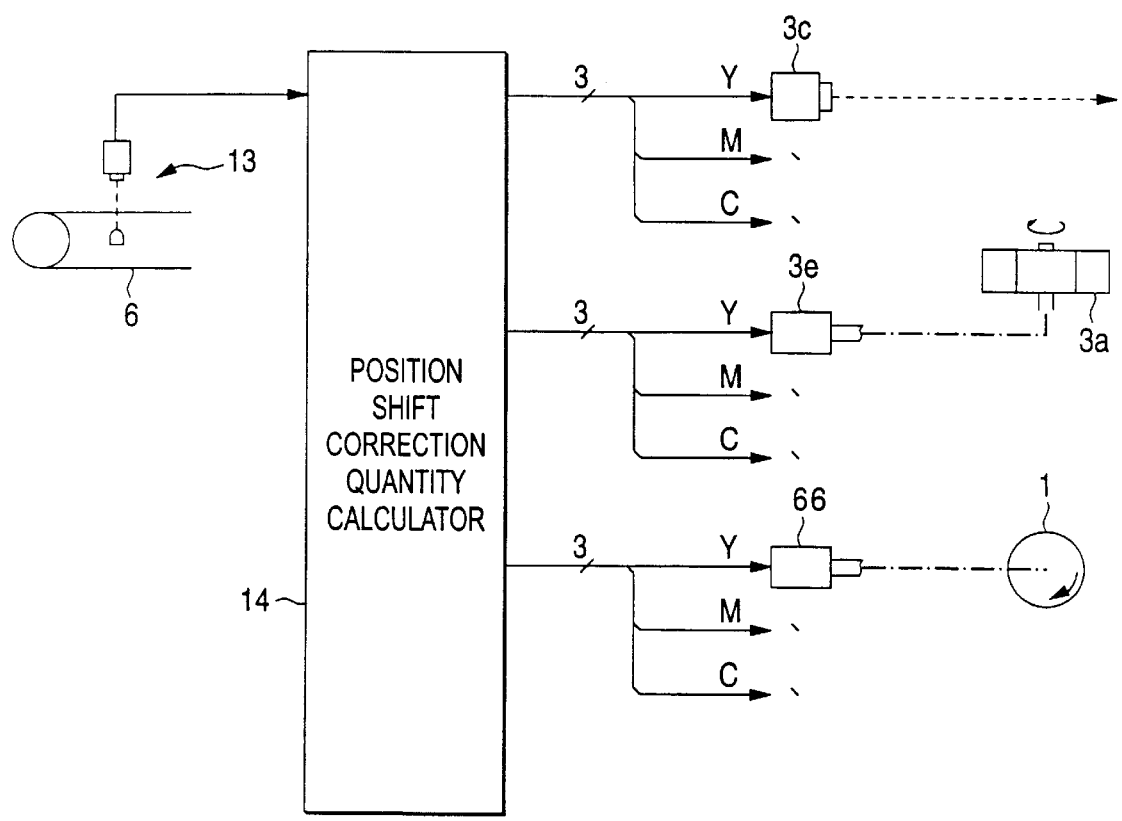
FIG. 5 is an overall conceptual drawing of a fine synchronizing control unit in the image forming apparatus of FIG. 1.

The fine synchronizing control unit has, for example, as shown in FIG. 5, an image reading sensor 13 for reading an image on the transfer belt 6, and a position-shift correction quantity calculating means 14 for detecting the position shift quantity of each toner image with respect to the black toner image and outputting a position-shift correction quantity based on the detected result. In accordance with the position-shift correction quantity, the fine synchronizing control unit controls light emission control start timing of the light emission control unit 3c in each of the monochromatic toner image forming units Y, M, C; the rotational phase of the polygon mirror 3a in each of the monochromatic toner image forming units Y, M, C; and the period of rotation of the photoconductive drum 1 in each of the monochromatic toner image forming units Y, M, C.

Figure 6:
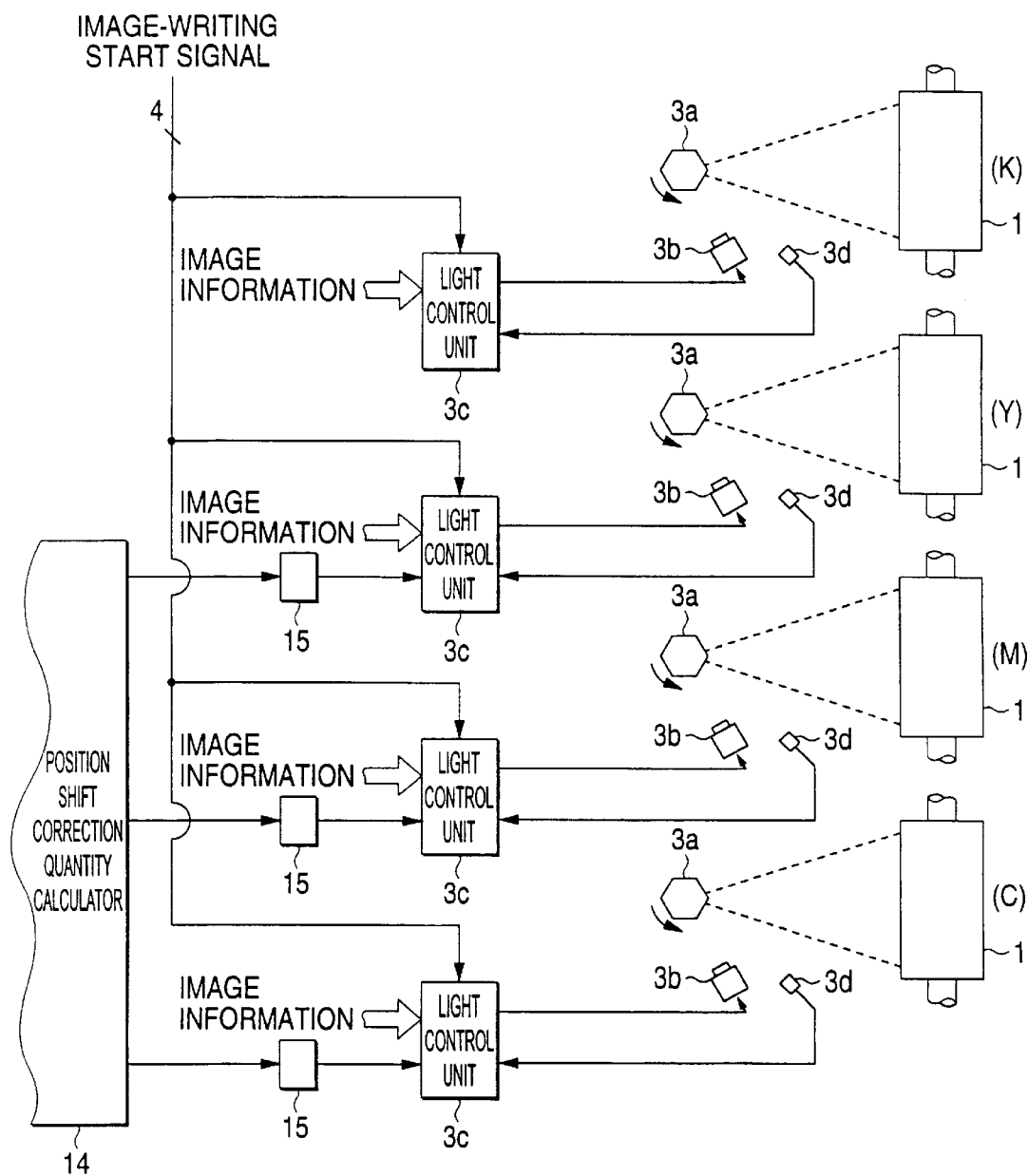
FIG. 6 is the first block diagram of the principal part of the fine synchronizing control unit of FIG. 5.

With the provision of, for example, a delay time setting means 15 for setting delay time until light emission control is started after the image-writing start signal is input to each light emission control unit 3c as shown in FIG. 6, the fine synchronizing control unit may control the light emission control start timing of the light emission control unit 3c by varying the delay time value set by the delay time setting means 15 according the position-shift correction quantity.

Figure 7:
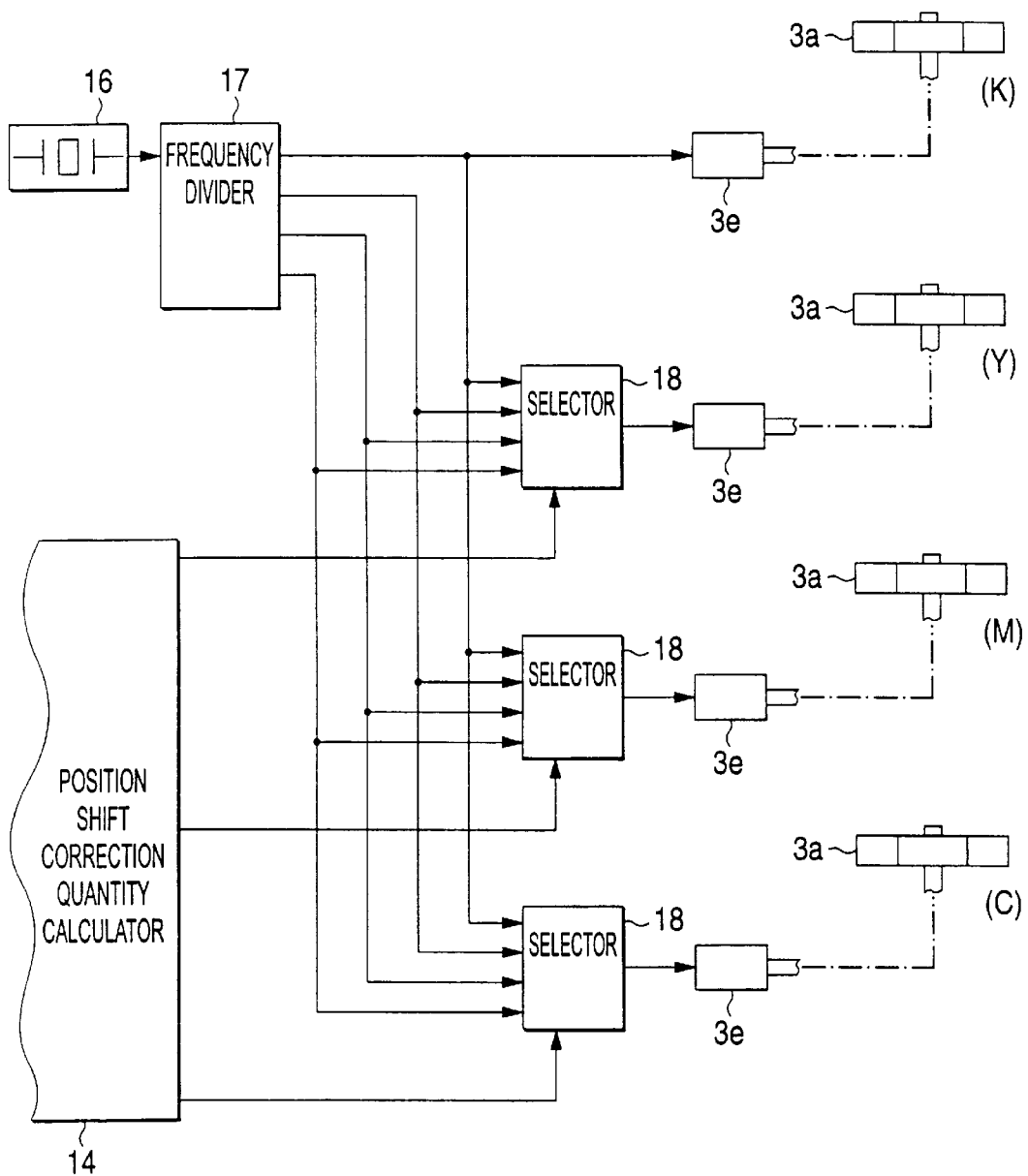
FIG. 7 is the second block diagram of the principal part of the fine synchronizing control unit of FIG. 5.

Moreover, the fine synchronizing control unit may control the rotational phase of the polygon mirror 3a by means of, for example, an oscillator for outputting a predetermined cyclic clock signal, a frequency divider 17 for converting the clock signal into clock signals different in phase, and three selectors 18 for outputting one of the four divided clock signals in conformity with setting-up as shown in FIG. 7. More specifically, the outputs of the three selectors 18 are input to the polygon mirrors driving motors 3e of the each of the monochromatic toner image forming units Y, M, C and the selection of the three selectors 18 is varied in accordance with the position-shift correction quantity. FIG. 8 shows the relation between the divided clock signal and the rotational phase thereby in examples of polygon mirrors 3a in the form of a hexagonal four division.

Figure 9A:
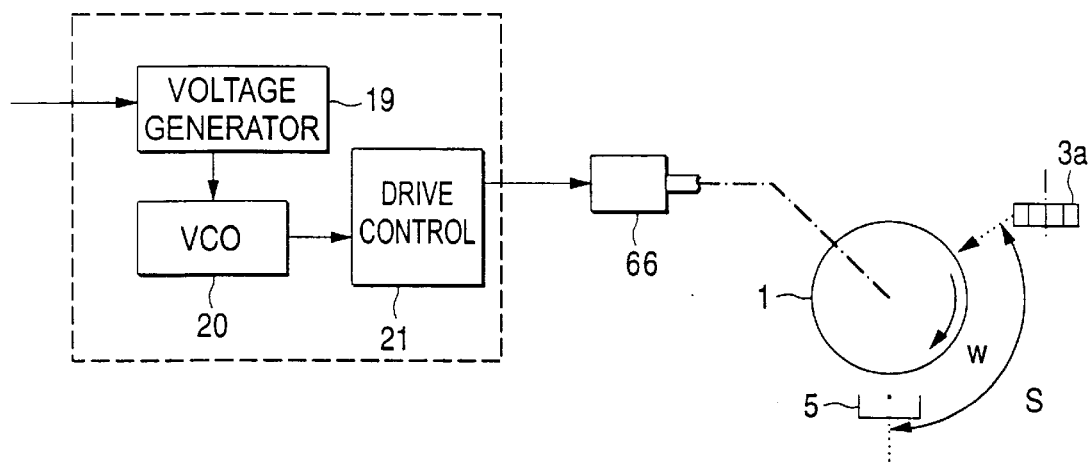
FIGS. 9A to 9C are the third block diagram of the principal part of the fine synchronizing control unit of FIG. 5.
Figure 9B:
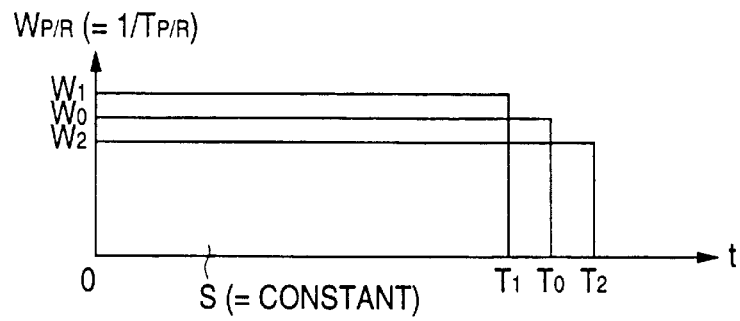
Figure 9C:
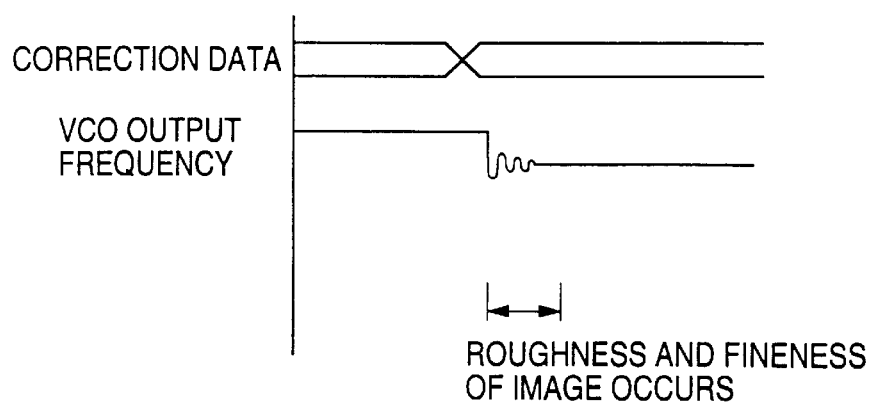

The fine synchronizing control unit may control the rotational phase of the photoconductive drum 1 by means of, for example, a reference voltage generator 19 for outputting a reference voltage in accordance with the position-shift correction quantity, a voltage control type oscillating circuit for outputting the predetermined cyclic signal in response to the reference voltage, and a drive control circuit 21 for driving the photoconductive-drum driving stepping motor 66 according to the predetermined cyclic signal as shown in FIG. 9A. When the predetermined cyclic signal is adjusted as shown in FIG. 9B further, it is possible to adjust the timing at which the toner image arrives at the transfer position since the time required for the photoconductive drum 1 to be moved from the exposure position up to the transfer position varies accordingly. As shown in FIG. 9C, the period of the output signal of the voltage control type oscillating circuit 20 becomes disturbed when the reference voltage is varied and if an image is written and transferred at this timing, the image may become distorted. Therefore, it has been arranged to vary such a reference voltage at the time the image is not formed (at least at non-transfer or non-image writing time).

According to this embodiment of the invention, a registration control cycle for color shift correction is effected at the non-image writing time and the fine synchronizing control unit makes fine adjustment in that cycle.

Figure 10:
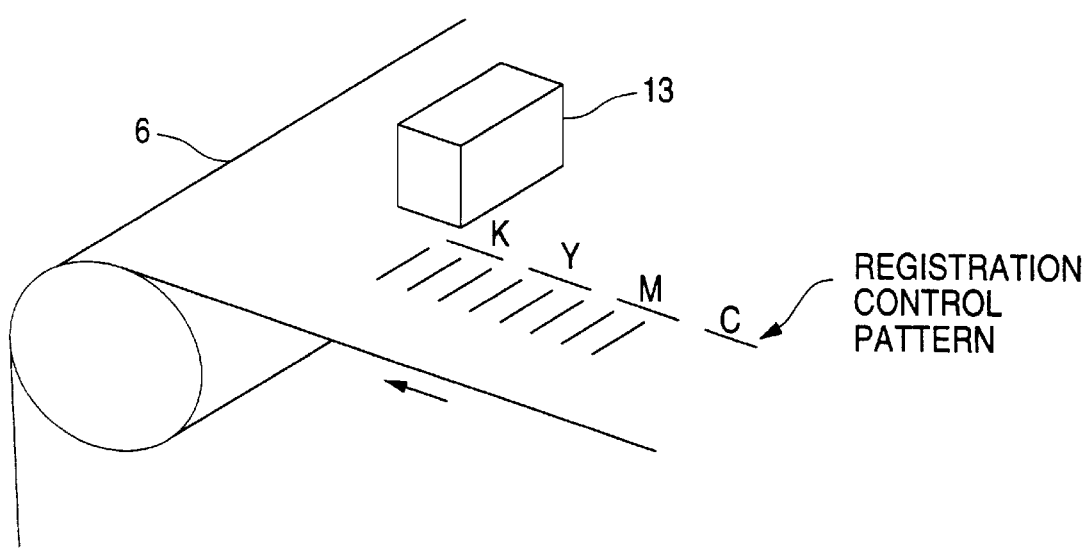
FIG. 10 is a diagram explanatory of the operating state at a registration control cycle for color shift correction.
Figure 11:
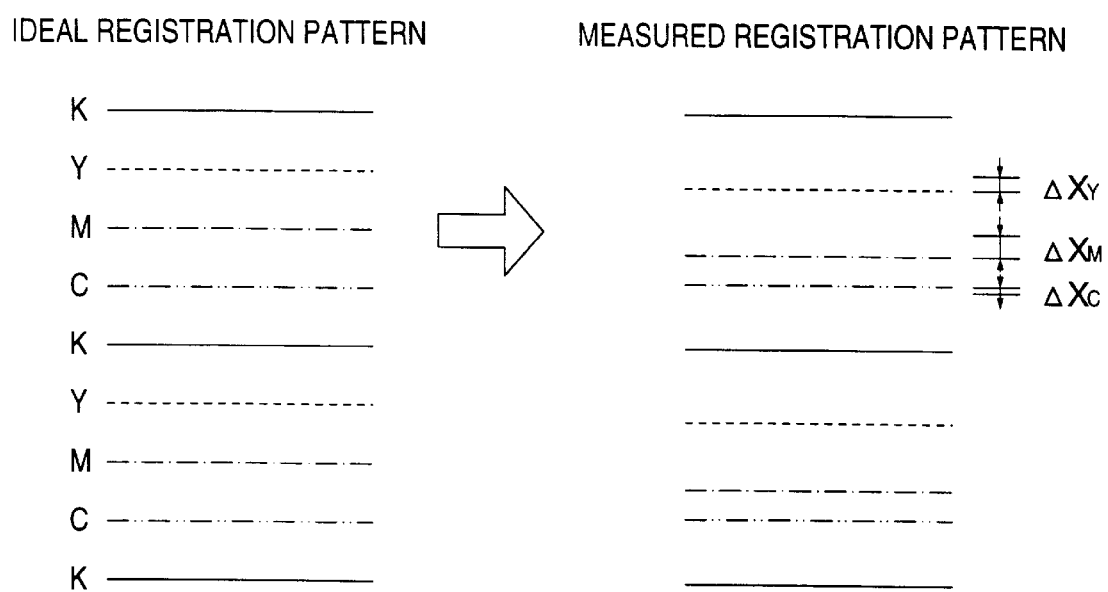
FIG. 11 is a diagram explanatory of a registration control pattern to be formed on printing paper in a cycle of FIG. 10.

In that cycle, a registration control pattern is formed in each of the monochromatic toner image forming units Y, M, C and the registration control pattern of each color is transferred onto the transfer belt 6, so that the image on the transfer belt 6 is read (sampled) by the image reading sensor 13. FIG. 10 shows a state in which the image reading sensor 13 is performing the reading operation. Further, FIG. 11 shows a registration pattern (ideal registration pattern) free from a color shift and an example of variation in a measured registration pattern when the color shift occurs. In FIG. 11, ΔX refers to the registration correction quantity of each color.

Figure 12:
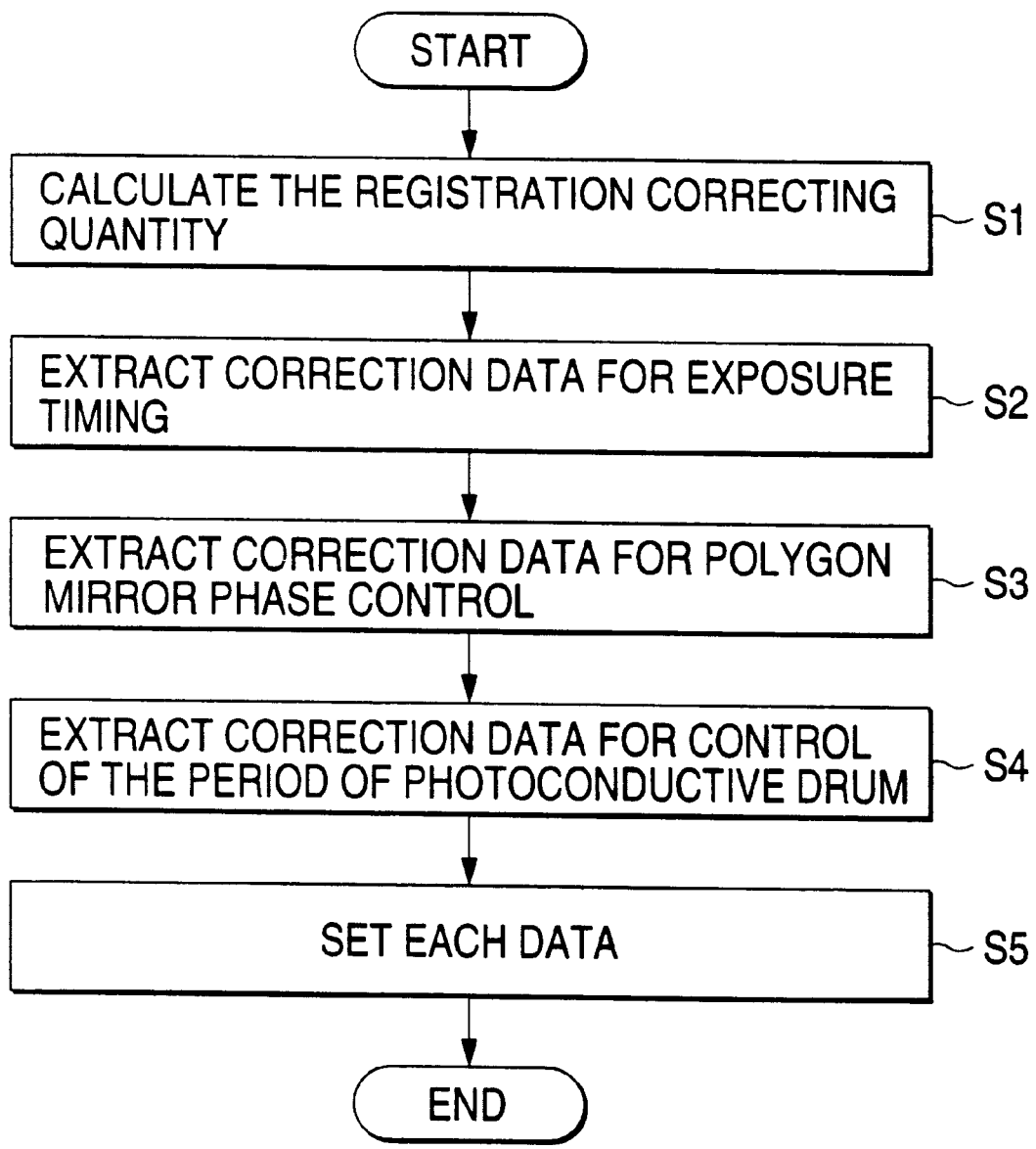
FIG. 12 is a flowchart showing the operation of position-shift correction quantity calculating means in the cycle of FIG. 10 (total).

Subsequently, as shown in FIG. 12, the position-shift correction quantity calculating means 14 in the cycle above calculates the registration correcting quantity of each color on the basis of the read image above (S1), successively extracts correction data for exposure timing of each color, for polygon mirror phase control and for control of the period of the photoconductive drum on the basis of the registration correcting quantity (S2–S4), and terminates the operation by setting these data (S5).

Figure 13:
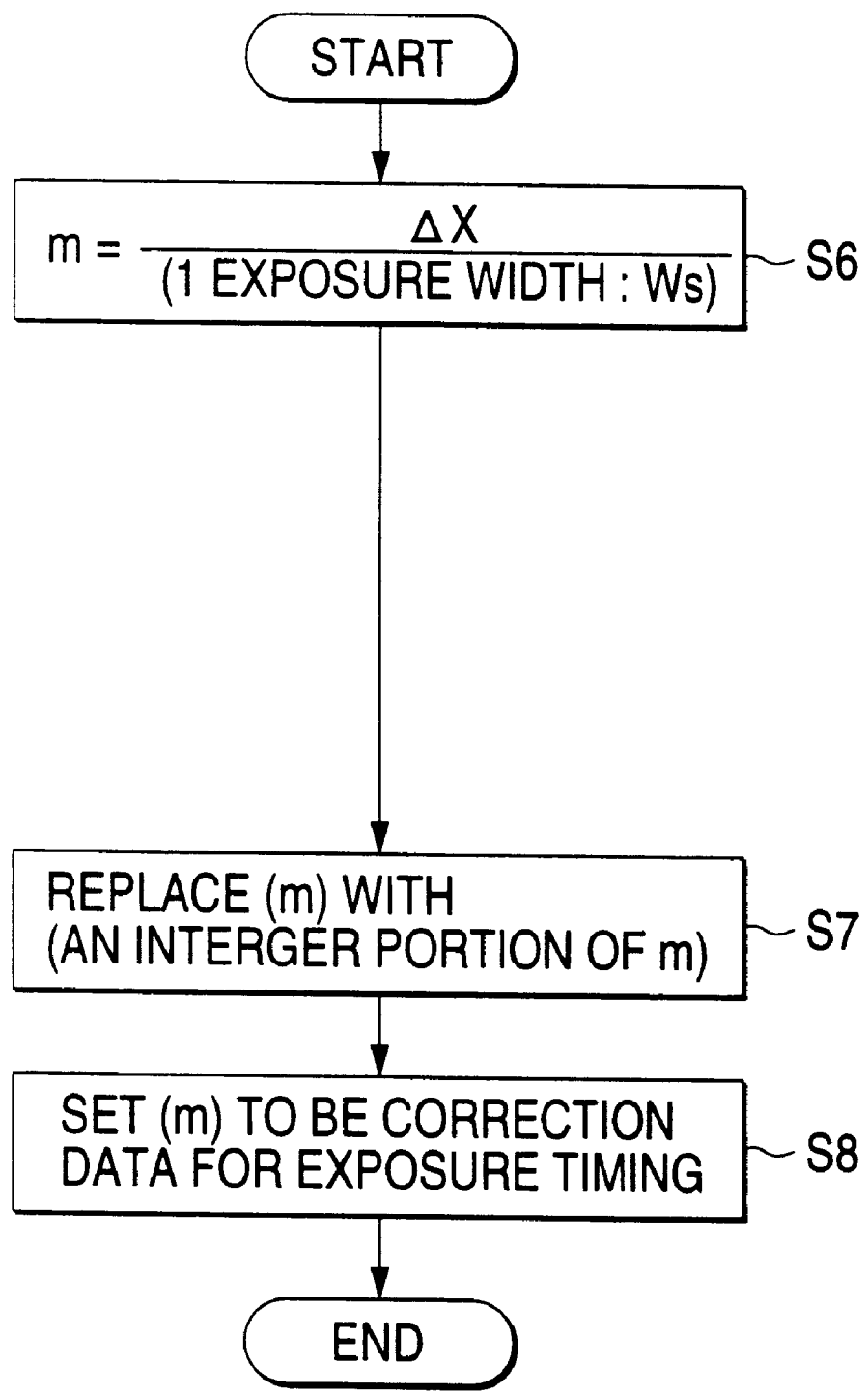
FIG. 13 is a flowchart showing the operation of position-shift correction quantity calculating means in the cycle of FIG. 10 (detailed flowchart of S2).

A method of calculating correction data for exposure timing of each color on the basis of the registration correcting quantity in the cycle above is to, for example, calculate an integer portion as the correction data when the registration correcting quantity above is divided by one exposure width (the width of one pixel according to this embodiment of the invention) (S6–S8) as shown in FIG. 13.

Figure 14:
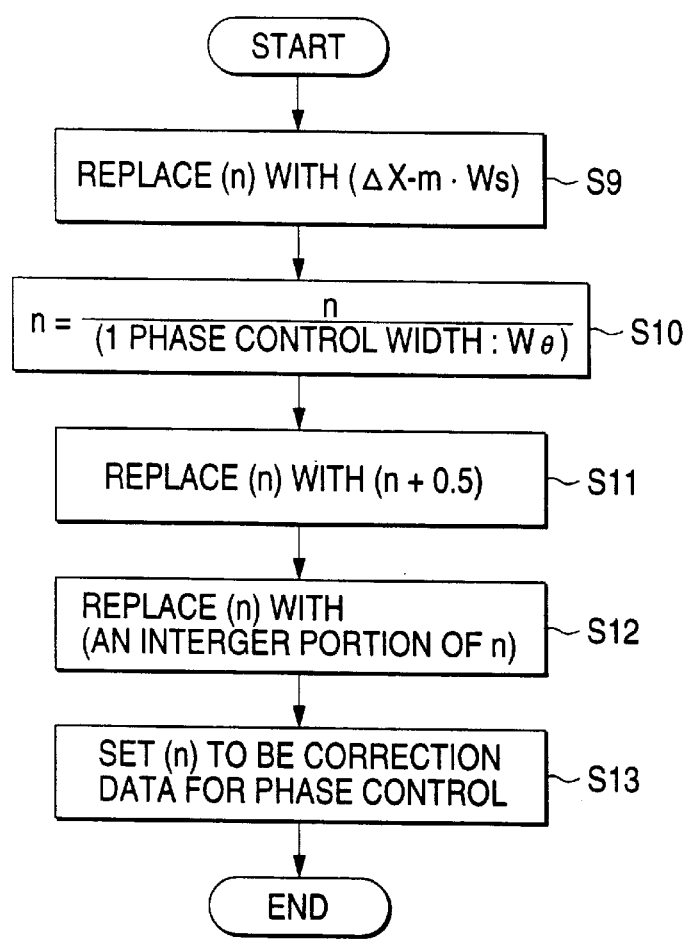
FIG. 14 is a flowchart showing the operation of position-shift correction quantity calculating means in the cycle of FIG. 10 (detailed flowchart of S3).
Figure 15:
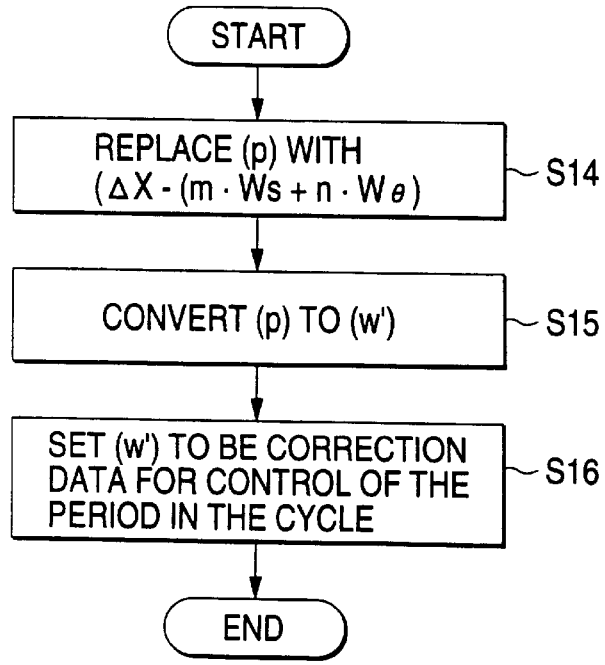
FIG. 15 is a flowchart showing the operation of position-shift correction quantity calculating means in the cycle of FIG. 10 (detailed flowchart of S4).

A method of calculating the correction data for polygon mirror phase control in the cycle above is to, for example, calculate an integer portion as the correction data by subtracting from the registration correcting quantity the quantity of correction resulting from the exposure timing correction and dividing the value obtained through the substraction by one phase control width (the width shift of the toner image produced when the phase of the polygon mirror 3a is shifted by one) (S9, S10, S12, S13) as shown in FIG. 14.

A method of calculating the correction data for control of the period of the photoconductive drum in the cycle above is to, for example, calculate the correction data by subtracting from the registration correcting quantity the quantity of the exposure timing correction and the polygon mirror phase correction and converting the value obtained into angular velocity (S14–S16).

As shown at Step S11 of FIG. 14, further, 0.5 is added to what is obtained by dividing the value obtained through the substraction by the one phase control width when the correction data for the polygon mirror phase control, whereby control of the period of the photoconductive drum 1 is effected by correcting the reference rotational period of the photoconductive drum 1 to its forward or backward status. Thus, proper correction can be made.

In the case above, a predetermined full-color image was formed on copying paper P with the image forming apparatus after the registration control cycle for the color shift correction was executed.

Consequently, the full-color image was set free from a color shift and a hollow character and besides had excellent image quality.

When the image thus obtained was examined after only the rotational period of the photoconductive drum 1 in the image forming apparatus was adjusted, no image deterioration was observed even in a case where the rotational period was adjusted to the extent that a color shift of approximately 200–300 $\mu$m was corrected, to say nothing of a case where the rotational period was adjusted to the extent that a color shift of several 10 $\mu$m was corrected.

(Embodiment 2)

Figure 16:
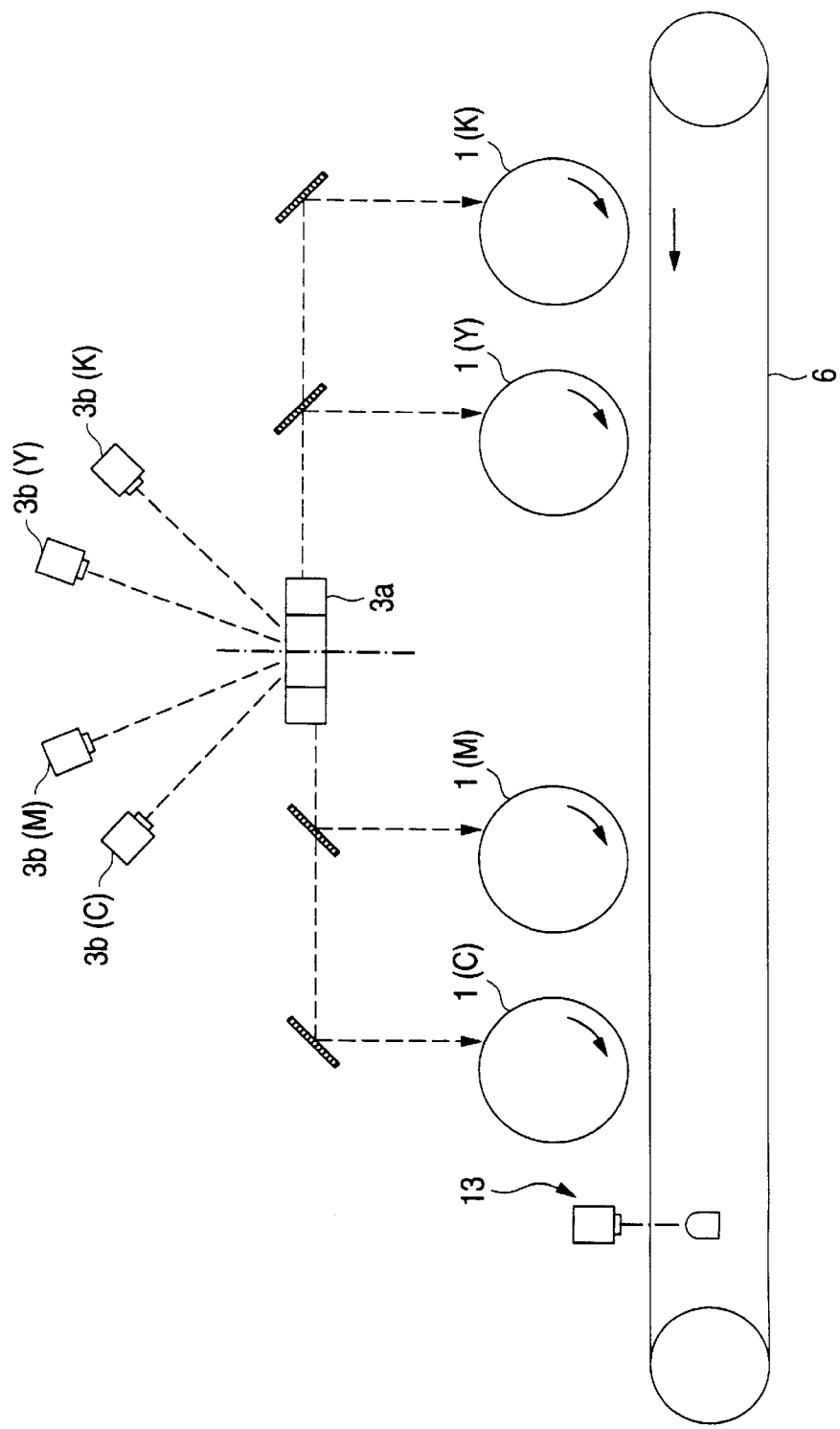
FIG. 16 is a schematic block diagram of an image forming apparatus as Embodiment 2 of the invention.

As shown in FIG. 16, an image forming apparatus according to this embodiment of the invention employs four laser diodes 3b for irradiating one polygon mirror 3a with exposure light and causes the polygon mirror 3a to reflect the exposure light to a corresponding photoconductive drum 1. Further, a fine synchronizing control unit has an image reading sensor 13 for reading an image on a transfer belt 6 and a position-shift correction quantity calculating means 14 for detecting the transfer position shift of the read image of each color toner with respect to the read image of black toner on the basis of the images read by the image reading sensor 13 and outputting position-shift correction quantity on the basis of the detected results. Further, the light emission control start timing of a light emission control unit 3c in each of the monochromatic toner image forming units Y, M, C and the rotational period of the photoconductive drum 1 are controlled according to the position-shift correction quantity. The hardware configuration other than what has been described above is similar to that of Embodiment 1 of the invention.

Figure 17:
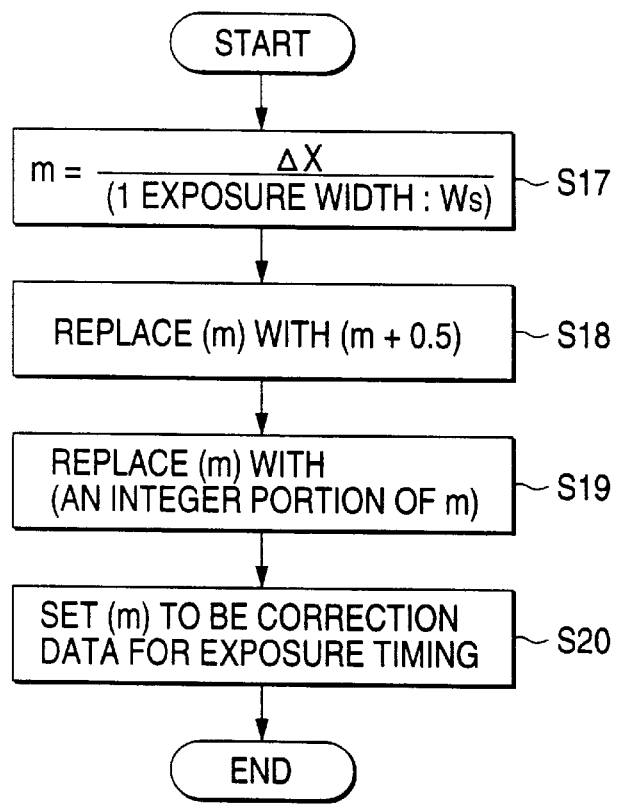
FIG. 17 is one flowchart showing the operation of a position-shift correction quantity calculating means in the image forming apparatus of FIG. 16.
Figure 18:
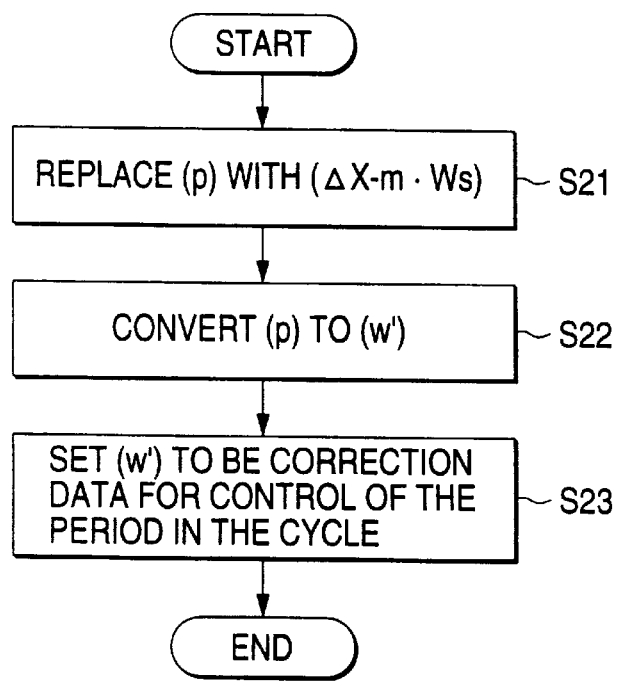
FIG. 18 is the other flowchart showing the operation of a position-shift correction quantity calculating means in the image forming apparatus of FIG. 16.

According to this embodiment of the invention, when correction data for exposure timing of each color was calculated on the basis of registration correcting quantity in a registration control cycle for color shift correction as shown in FIG. 17, the registration correcting quantity was divided by one exposure width (width of one pixel according to this embodiment of the invention) and then 0.5 was added to the resulting value (S18) and when correction data for control of the period of the photoconductive drum was calculated as shown in FIG. 18, the registration correcting quantity was subtracted from the quantity of correction resulting from the exposure timing correction (S21) and the value obtained was converted into angular velocity.

Although 0.5 was added to the value obtained by dividing the value obtained through the subtraction by one exposure width when the correction data for the exposure timing is calculated, the reason for this is the same as described in Embodiment 1.

A predetermined full-color image was formed on copying paper P with the image forming apparatus likewise after the registration control cycle for the color shift correction was executed.

Consequently, the full-color image was set free from a color shift and a hollow character and besides had excellent image quality.

When the image thus obtained was examined after only the rotational period of the photoconductive drum 1 in the image forming apparatus was adjusted, no image deterioration was observed even in a case where the rotational period was adjusted to the extent that a color shift of approximately 200–300 $\mu$m was corrected, to say nothing of a case where the rotational period was adjusted to the extent that a color shift of several 10 $\mu$m was corrected.

Embodiment 3

Figure 19:
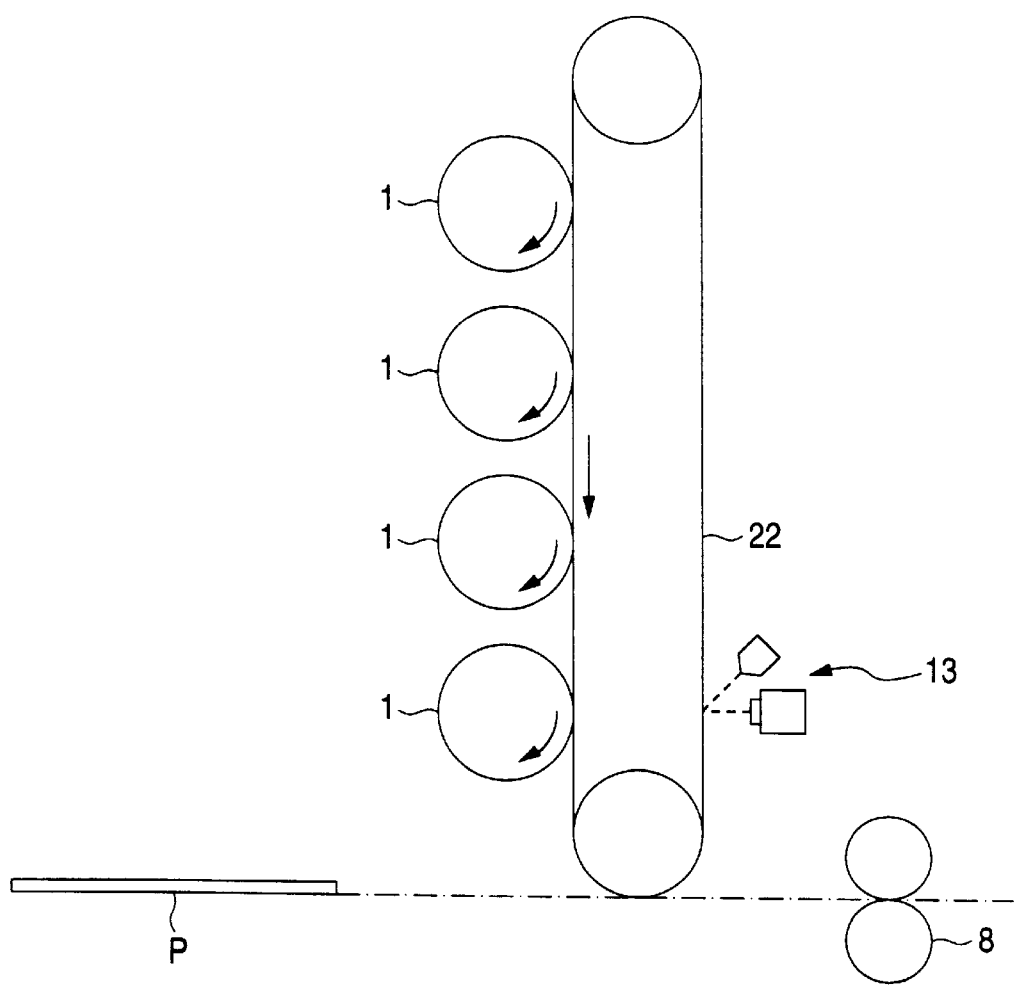
FIG. 19 is a schematic block diagram of an image forming apparatus as Embodiment 3 of the invention.
Figure 20:
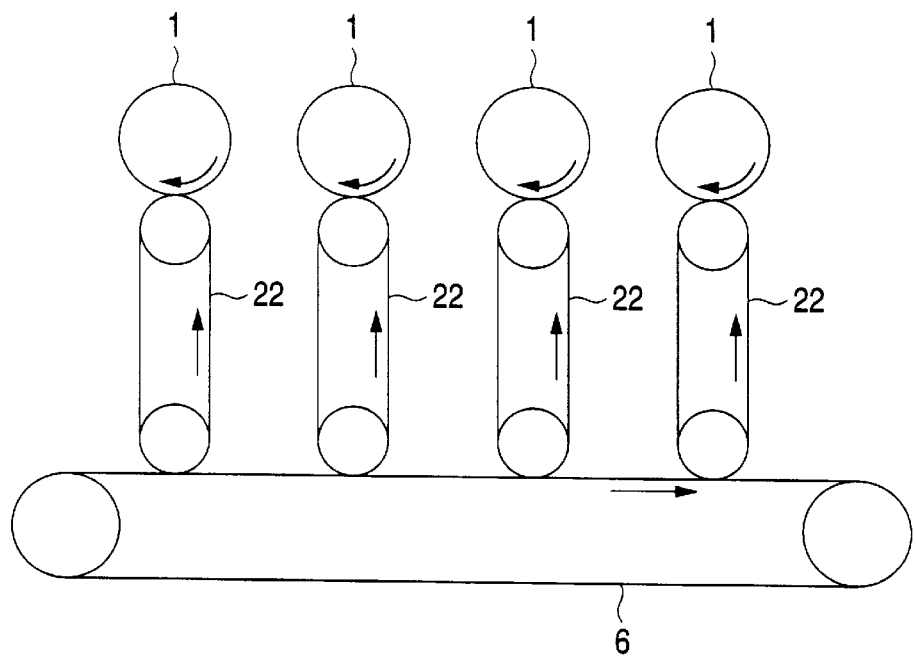
FIG. 20 is another block diagram of an image forming apparatus using an intermediate transfer belt as a toner image carrier.
Figure 21:
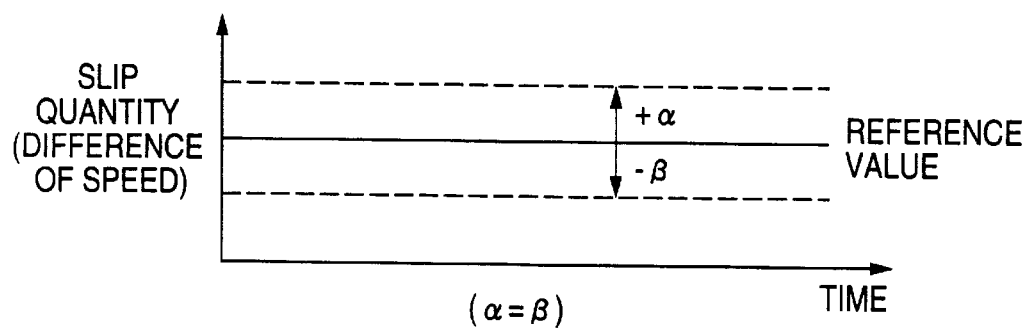
FIG. 21 is an example of setting a period adjusting range with respect to a reference rotational period of a toner image carrier.

An image forming apparatus according to this embodiment of the invention has, as shown in FIG. 19, a plurality of photoconductive drums 1 arranged in a line, an intermediate transfer belt 22 so installed along the photoconductive drums 1 that it is brought into contact with all of the photoconductive drums 1, and a conveyer channel of copying paper P in contact with the intermediate transfer belt 22. A monochromatic toner image formed on each photoconductive drum 1 is superposed one another (i.e., a multicolor toner image is directly formed on the intermediate transfer belt) and the images superposed thereon are collectively transferred onto the printing paper P passed through the conveyer channel, so that an image is formed on the printing paper.

Further, according to this embodiment of the invention, the image reading sensor 13 in Embodiment 1 is installed opposite to the intermediate transfer belt 22, and the light emission control start timing of a light emission control unit 3c in each of the monochromatic toner image forming units Y, M, C, the rotational phase of a polygon mirror 3a in each of the monochromatic toner image forming units Y, M, C and the rotational period of the photoconductive drum 1 in each of the monochromatic toner image forming units Y, M, C are controlled on the basis of the images read by the image reading sensor 13 (an arrangement of members in this case is similar to what is applicable to Embodiment 1).

A predetermined full-color image was formed on copying paper P with the image forming apparatus likewise after the registration control cycle for the color shift correction was executed.

Consequently, the full-color image was set free from a color shift and a hollow character and besides had excellent image quality.

As set forth above, a color shift can be corrected by adjusting the rotational period of each toner image carrier without adjusting any other control signal or the like in the image forming apparatus according to the present invention, hence it is possible to adjust even a color shift of one exposure width or less with high resolution and consequently to seek for high image quality.

What is claimed is:

1. An image forming apparatus for forming a multicolor toner image by superposing a plurality of monochromatic toner images on a transfer material comprising:

a plurality of toner image carriers on which monochromatic toner images of different colors are respectively formed, toner-image-carrier driving means for driving all said toner carriers to rotate in a predetermined period, and position-shift correction quantity detecting means for detecting the position shift quantity of each monochromatic toner image in the multicolor toner image or a value correlated thereto and outputting position-shift correction quantity corresponding to the detected result, wherein said toner-image-carrier driving means controls the period of rotational driving of each toner image carrier in conformity with the position-shift correction quantity.

2. The image forming apparatus of claim 1, wherein a reference rotational period of said toner image carrier is set in the substantially middle of a period regulating range by means of said toner-image-carrier driving means.

3. The image forming apparatus of claim 1, wherein said toner-image-carrier driving means controls the rotational period of each toner image carrier at the time no image is formed.

4. The image forming apparatus of claim 1, wherein said toner-image-carrier driving means:
(a) is one-to-one connected each toner image carrier,
(b) has
a plurality of stepping motors for rotating in conformity with the period of an input signal, and
a plurality of voltage control type oscillating circuits for supplying a signal of a predetermined period to each stepping motor, and
(c) controls the control voltage supplied to each voltage control type oscillating circuit in conformity with the position-shift correction quantity.

5. The image forming apparatus of claim 1, wherein the plurality of toner image carriers include latent image carriers on which latent images are respectively formed by exposure to light, and further comprising:

exposure means for subjecting each latent image carrier to exposure scanning on a one pixel basis, and forming a latent image on each latent image carrier on a one pixel width basis by superposing image information on the exposure light in order to form a monochromatic toner image on each of the latent image carriers, wherein said exposure means controls timing at which the image information is superposed on the exposure light in conformity with the position-shift correction quantity, and wherein with respect to adjustment of one pixel width or less, said toner-image-carrier driving means controls the period of rotational driving of each toner image carrier.

6. The image forming apparatus of claim 5, wherein said exposure means has
  a rotatable polygon mirror, and
  a light emitting element capable of emitting light according to image information, and one-to-one or one-to-plurality corresponding to said latent image carrier, and wherein said polygon mirror and said light emitting element in pair form a latent image on each latent image carrier.

7. The image forming apparatus of claim 1, wherein the plurality of toner image carriers include latent image carriers on which latent images are respectively formed by exposure to light, and further comprising:

exposure means for subjecting each latent image carrier to exposure scanning on the basis of a plurality of pixels, and forming a latent image on each latent image carrier on the basis of width of a plurality of pixels by superposing image information on the exposure light in order to form a monochromatic toner image on each of said latent image carriers, wherein said exposure means adjusts timing at which the image information is superposed on the exposure light in conformity with the position-shift correction quantity, and wherein with respect to adjustment of width of the plurality of pixels or less, said toner-image-carrier driving means controls the period or rotational driving of each toner image carrier.

8. The image forming apparatus of claim 1, wherein the plurality of toner image carriers include latent image carriers on which latent images are respectively formed by exposure to light, and further comprising:

exposure means for subjecting each latent image carrier to exposure scanning on the basis of one pixel or a plurality of pixels, and forming a latent image on each latent image carrier on the basis of width of one exposure width by superposing image information on the exposure light in order to form a monochromatic toner image on each of the latent image carriers, wherein said exposure means
  has
  a rotatable polygon mirror, and
  a light emitting element capable of emitting light according to image information, and controls timing at which the image information is superposed on the exposure light in conformity with the position-shift correction quantity, and wherein with respect to adjustment of one exposure light width or less, said exposure means controls the rotational phase of each polygon mirror, whereas said toner-image-carrier driving means controls the period of rotational driving of each toner image carrier.

* * * * *